United States Patent Office 3,251,782
Patented May 17, 1966

3,251,782
PROCESS FOR INHIBITING FOAM FORMATION IN AQUEOUS TALC DISPERSIONS
Robert Stephen Hanzel, Waynesboro, Va., and Stanley Earl Krahler, Wilmington, Del., assignors to E. I. du Pont de Nemours and Company, Wilmington, Del., a corporation of Delaware
No Drawing. Filed June 28, 1963, Ser. No. 291,266
6 Claims. (Cl. 252—321)

This inventidon relates to dispersions of talc in water. More particularly, it relates to the prevention of undesirable foaming of aqueous talc dispersions.

Many aqueous talc dispersions, when vigorously agitated, produce a thick layer of foam above the dispersion. Such frothing or foaming interferes with the efficient use of tac dispersions. Although there are known agents which prevent or dissipate these foams, the known agents are undesirable because of poor color, dispersion instability or are not effective in the presence of certain materials such as dimethylformamide. Since aqueous talc dispersions are frequently used as finishes for spandex filaments which are conventionally wet-spun from dimethylformamide, foaming in such systems is a recognized problem.

This invention serves to prevent the foaming of aqueous talc dispersions. This advantage is accomplished by a composition of matter comprising talc, water, and at least 0.14% by weight based on talc of the sulfate of the polymeric cation:

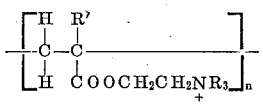

wherein R is lower alkyl, R' is selected from the group consisting of hydrogen and methyl, and $n$ is a large integer. The R groups, which may be the same or different, may contain from 1 to 4 carbon atoms. Surprisingly, the cationic agents specified above not only prevent foaming of talc-in-water dispersions but also prevent foaming of such dispersions which additionally contain minor amounts of dimethylformamide.

As indicated above, talc dispersions are used as finishes for spandex tow to prevent interfilament adhesion. For this application, various forms of talc may be used. Among the useful types are products having small particle size obtained from foliated, granular or fibrous masses of talc. In the talc dispersions for use as finishes, the talc generally constitutes from about 15% to about 25% by weight of the dispersion.

The anti-foaming agents useful in the present invention are the sulfate salts of the trialkylammoniumethyl esters of polyacrylic and polymethacrylic acids. These materials may also be designated as polydialkylaminoethyl acrylates and methacrylates quaternized with lower alkyl sulfates. The acrylate and methacrylate polymers containing the tertiary amino nitrogen, i.e., before quaternization, may be prepared as described in U.S. Patents 2,138,762, and 2,138,763. Those polymers described in these two patents and falling within the scope of the formula

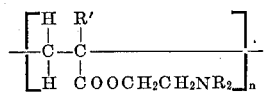

wherein R, R', and $n$ have the significance specified hereinabove, are useful for the preparation of the quaternary salts utilized in the present invention. The quaternization with a lower alkyl sulfate, such as dimethyl sulfate or diethyl sulfate, is carried out under procedures well known in the art. Examples of quaternary salts useful in the practice of this invention are polymeric diethylaminoethyl methacrylate quaternized with dimethyl sulfate and polymeric dimethylaminoethyl methacrylate quaternized with diethyl sulfate. The former composition is preferred for use in this invention.

The quaternary salts described hereinabove are useful in the practice of this invention at concentrations as low as about 0.14% by weight based on the talc present in the aqueous dispersion. At this concentration, very slight amounts of foam may form above the dispersion and promptly break, so that this concentration affords entirely satisfactory results. Concentrations of up to about 0.5% based on talc are also effective but afford no additonal advantages and are, therefore, not preferred from the standpoint of economics.

In the preparation of aqueous talc dispersions containing the quaternary salts, care must be taken to exclude materials such as the polyethylene oxide adducts of the long chain alcohols, particularly the adducts of 20 mols of ethylene oxide per mol of oleyl alcohol.

The invention will be further illustrated, but is not intended to be limited, by the following examples in which parts and percentages are by weight unless otherwise specified.

*Example I*

A dilute aqueous solution of stabilizer is obtained by the addition of 1.75 parts of an 8.3% aqueous solution of polydiethylaminoethyl methacrylate quaternized with dimethyl sulfate, to 400 parts of demineralized water. To this solution is added 100 parts of talc 399.* The mixture is stirred until all the talc is dispersed. The mixture contains about 0.143% (based on talc) of the quaternary salt. No appreciable foam is observed on vigorous agitation of the mixture or when air is bubbled through the mixture at a rate of 0.24 cubic foot per minute. No foaming is observed on the addition of 60 parts of dimethylformamide.

In a similar mixture containing no quaternary salt and no dimethylformamide, troublesome foaming is observed under the same conditions. When five parts of dimethylformamide is then added, the degree of foaming is much increased.

*Example II*

A solution of 0.06% polydiethylaminoethyl methacrylate quaternized with dimethyl sulfate, in demineralized water is prepared. To 400 parts of this solution is added 80 parts of talc 399.* The mixture is stirred until all the talc is dispersed. The mixture contains about 0.3% (based on talc) of the quaternary salt. No appreciable foam is observed on vigorous agitation of the mixture or when air is bubbled through the mixture at a rate of 0.24 cubic foot per minute. No appreciable foaming is observed on the addition of 20 parts of dimethylformamide.

In a similar mixture contaning no quaternary salt and no dimethylformamide, troublesome foaming is observed under the same conditions. When two parts of dimethylformamide is then added, the degree of foaming is much increased.

The quaternary salts described hereinabove are known to be permanent antistatic agents for synthetic filaments. It should be noted that in the practice of this invention the antifoaming agents are used at levels far below those at which they are used as antistats. The level recommended for static protection on fibers is from 2.5% to 3.0% by weight based on the fiber. In the practice of this invention, the quaternary salt may be taken up by a filament which is passed through the stabilized talc dispersion.

*Sold by Whittaker, Clark and Daniels, Inc.

However, in the practice of this invention, the level of the salt on the filament does not exceed about 0.025%.

The quaternary salts described hereinabove are useful anti-foaming agents in aqueous talc dispersions. This advantage is not lost in the presence of the well known dimethly carbamyl solvents, such as dimethylformamide and dimethylacetamide. Furthermore, the quaternary salts significantly improve the stability of the aqueous talc dispersions. Talc tending to separate from the dispersion is easily redispersed by moderate stirring or shaking. Concentrations of talc in the range from about 5% to about 30% are stabilized by the process of the present invention.

As previously mentioned the quaternary ammonium salts useful in the practice of this invention may be prepared by known procedures. Their preparation from tertiary amines is disclosed in U.S. 2,741,568. Quaternization with, for example, dimethyl, diethyl or dibutyl sulfate may be carried out prior to or after polymerization of the monomers. The polymers useful in the present invention are those in which $n$ as defined previously herein is an integer which provides a molecular weight in the range from about 20,000 to about 100,000.

The aqueous talc dispersions containing the anti-foaming agents find particular utility as finishes for spandex tow and staple products and are also useful in the coagulation bath in the wet spinning of a fully opened spandex tow. It will be apparent that the finishes may contain a variety of innocuous, i.e., non-foam producing ingredients such as fugitive tints, dyes, etc., in addition to the essential ingredients specified in the following appended claims.

We claim:

1. A process for inhibiting foam formation in aqueous talc dispersions which consists essentially of dispersing talc in an aqueous medium by stirring and adding to the dispersion at least 0.14% by weight based on the weight of the talc of the sulfate of a polymeric quaternary ammonium compound having the formula

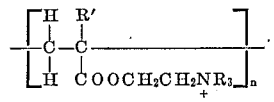

wherein R is lower alkyl, R' is selected from the group consisting of hydrogen and methyl, and $n$ is an integer which provides a molecular weight in the range from about 20,000 to about 100,000.

2. The process of claim 1 wherein the talc is present in an amount from about 15% to about 25% and said sulfate is present in an amount from 0.14% to about 0.5%.

3. The process of claim 2 wherein R' is methyl.

4. An aqueous finish for textile fibers consisting essentially of talc and at least 0.14% by weight based on the weight of talc of the sulfate of polymeric quaternary ammonium compound having the formula

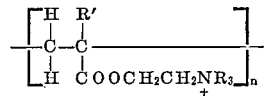

wherein R is lower alkyl, R' is selected from the group consisting of hydrogen and methyl, and $n$ is an integer which provides a molecular weight in the range from about 20,000 to about 100,000.

5. The finish of claim 4 wherein the talc is present in an amount from about 15% to about 25% and said sulfate is present in an amount from about 0.14% to about 0.5%.

6. The finish of claim 5 wherein R' is methyl.

References Cited by the Examiner

UNITED STATES PATENTS

| | | | |
|---|---|---|---|
| 2,200,485 | 5/1940 | Broderson et al. | 252—321 |
| 2,453,351 | 11/1948 | Tremain et al. | 252—321 |
| 2,741,568 | 4/1956 | Hayek | 252—8.8 |
| 2,965,594 | 12/1960 | Maeder | 252—8.8 |
| 3,115,384 | 12/1963 | Cacella et al. | 264—184 |

JULIUS GREENWALD, *Primary Examiner.*